March 22, 1966 H. L. FUNK ETAL 3,242,462

TRANSMISSION SYSTEMS

Filed Jan. 31, 1963 2 Sheets-Sheet 1

INVENTORS
HOWARD L. FUNK
KENNETH E. SCHREINER
BY Stephen J. Limanek
ATTORNEY

TRANSMISSION SYSTEMS

Filed Jan. 31, 1963 2 Sheets-Sheet 2

United States Patent Office 3,242,462
Patented Mar. 22, 1966

3,242,462
TRANSMISSION SYSTEMS
Howard L. Funk, Yorktown Heights, and Kenneth E. Schreiner, Ossining, N.Y., assignors to International Business Machines Corporation, New York, N.Y., a corporation of New York
Filed Jan. 31, 1963, Ser. No. 255,385
1 Claim. (Cl. 340—146.1)

This invention relates to improved transmission systems and more particularly to improved systems for transmitting digital pulses.

It is well known that many transmission media, particularly telephone lines, greatly distort the waveform of a pulse transmitted therethrough. The original transmitted pulse having a time duration of one bit period is often received at the receiver of the system as a waveform spread over a time interval of ten or more bit periods. When a train of closely spaced pulses are transmitted through a system having this delay distortion, the delayed portions of the received waveforms produce intersymbol interference which makes detection of the individual pulses of the train difficult or impossible.

In a commonly assigned copending application, Serial No. 245,540 filed by E. Hopner and H.R. Ulander on December 18, 1962, there is described a linear transmission system which automatically equalizes the phase distortion in a transmission system by utilizing time reversal techniques. In the transmission system described in the above-identified copending application, the distorted form of a test pulse is sampled and quantized at the receiver and the quantized data is transmitted to the transmitter wherein there is produced from the quantized data a predistorted wave which is a time reversed replica of the distorted wave received at the receiver. A control circuit responsive to standard data pulses of one bit duration releases a predistorted waveform of many bits duration for each pulse applied thereto. The resulting waveform at the receiver from the distorted waveform is a substantially standard pulse of one bit duration.

The system of the above-identified copending application is very useful for correcting or equalizing phase distortion in a transmission system but this time reversal technique does not compensate for amplitude distortion which is also present in many transmission systems.

In another commonly assigned copending patent application, Serial No. 245,498 filed by K. E. Schreiner on December 18, 1962, there is described and claimed a linear transmission system which provides automatic phase and amplitude equalization by noting the system response to a test pulse at intervals corresponding to the data bit sampling times and then repeatedly modifying the test pulse until the response is equal to zero at each bit sampling time except for the data peak sampling time.

Accordingly, it is an object of this invention to provide an improved phase and amplitude linear transmission system employing a comparator circuit.

Another object of this invention is to provide an improved transmission system wherein both phase and amplitude distortion are compensated which employs a counter circuit responsive to a comparator circuit.

A further object of this invention is to provide an improved transmission system employing automatic equalization techniques including comparator and counter circuits for simple and rapid equalization applicable to switched networks, such as telephone circuits.

In accordance with the present invention automatic phase and amplitude equalization are obtained in a system by noting at a receiver the system response to a test pulse, produced by a generator located at the transmitter of the system, at intervals corresponding to the data bit sampling times in a compare circuit and transmitting the noted information back to the transmitter and then modifying the test pulse in accordance with the information until the response is substantially equal to zero at each bit sampling time except for the data peak sampling time.

An important advantage of the system of the present invention is that the system utilizes simple and relatively few components for producing automatic phase and amplitude equalization in a transmission system.

An important feature of this invention is that only the position and polarity of an error voltage at data bit sampling times is transmitted back to the transmitter.

The foregoing and other objects, features and advantages of the invention will be apparent from the following more particular description of preferred embodiments of the invention, as illustrated in the accompanying drawings.

In the description which follows, it is shown how a predistorted waveform generator which first transmits a rectangular pulse of one bit time duration may be controlled to produce a complex waveform of many bit times duration as a result of information sent to the generator about the received signal. The resultant complex waveform is such as to permit high speed data transmission without intersymbol interference. The information about the received signal which is sent to the generator is taken at the bit sampling times, and in particular, the information is whether or not the received signal is of negligible magnitude at the bit sampling times. It should be noted that by performing corrections on a single pulse response, that corrections for any data sequence obtains.

Figure 1:
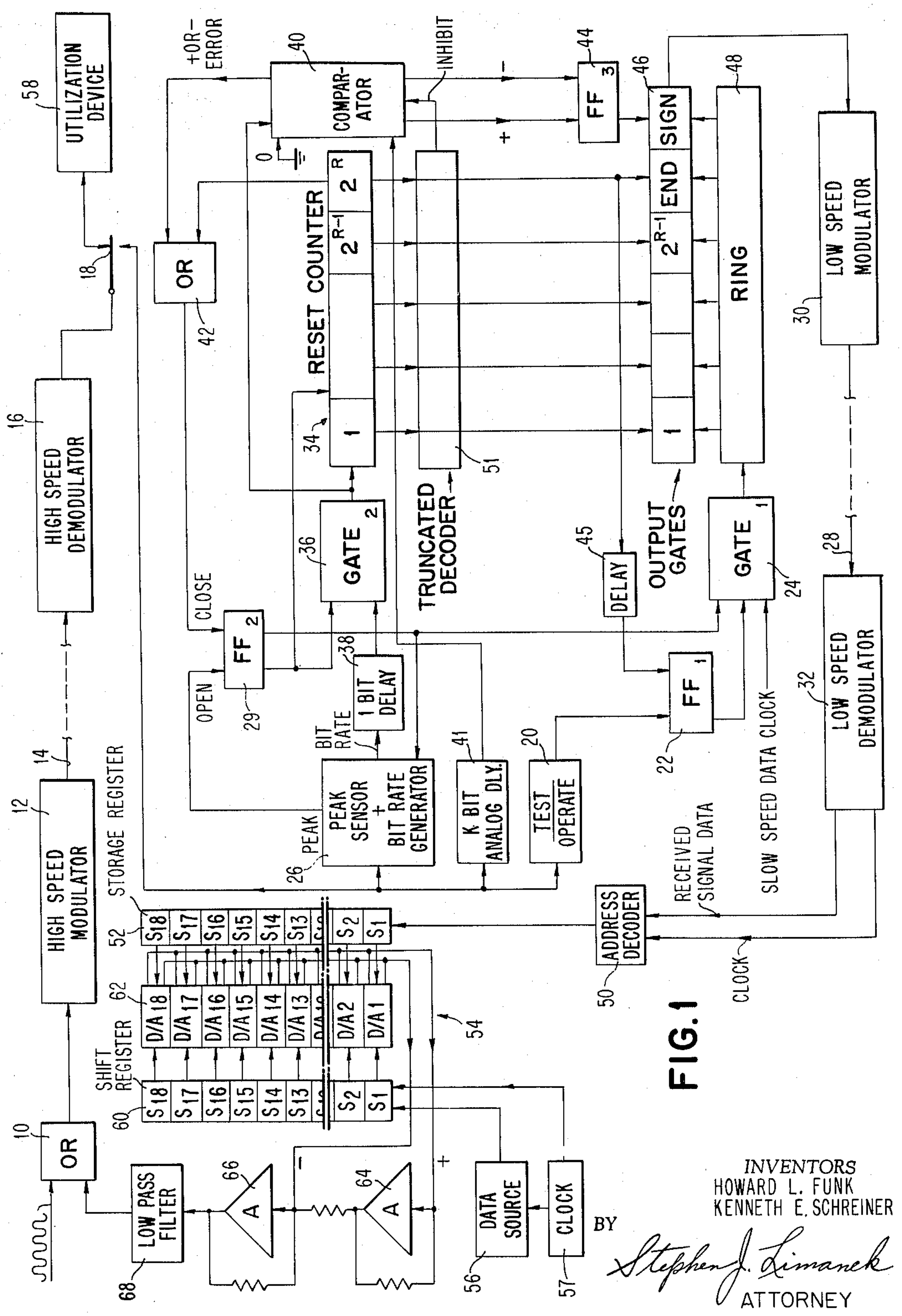
FIG. 1 illustrates one embodiment of the system of the present invention.

Referring to the drawings in more detail wherein like reference numerals represent similar elements, there is shown in FIG. 1 an embodiment of a system which automatically equalizes both phase and amplitude distortion. In the system a tone is sent through an OR circuit 10, a high speed linear modulator 12, a transmission medium 14, e.g., a telephone line, a high speed linear demodulator 16, a switch 18, when placed in its down position, and a frequency selective filter indicated as a test-operate block 20 to a first flip-flop 22 which operates one leg of a first gate 24. Then a sequence of test pulses each of one bit duration are sent from generator 54 through the modulator 12 and the demodulator 16 to a peak sensor and bit rate generator 26 which has a high Q tuned circuit responsive to the peak of the received test pulse. The peak sensor and bit rate generator performs two functions. First to detect the appearance of the peak of the received test pulse, and second to provide a train of equally spaced pulses at the data bit rate at which the system will ultimately run. The rate at which the sequence of test pulses is sent is less than the unequalized bit rate of a return channel, divided by $R+1$ where $R \geqslant 1n_2(n+1)$, $n$ being the number of bit times over which correction is required and R being an integer. The return channel shown in FIG. 1 is a transmission medium 28 connected to a low speed modulator 30 and to a low speed demodulator 32. The modulators 12 and 30 and the demodulators 16 and 32 may be any of the well known circuits found in conventional transmitters and receivers employed in the field of communications. The words "high" and "low" speed are used in this specification to indicate that modulator 12 and demodulator 30 are to be used for transmitting data at high speed once correction is made of intersymbol interference. On the other hand modulator 30 and demodulator 32 are used during the correction operation where data is fed back at a slower rate in order to avoid intersymbol interference.

An incoming distorted test pulse applied to the peak sensor and bit rate generator 26 produces an output voltage which opens a second flip-flop 29 at the peak time to reset a counter 34 to zero and condition a second gate 36. One bit time later, a pulse passing through a one bit delay 38 from the bit rate generator 26 steps the counter 34 to 1 and conditions a comparator 40. The comparator 40 includes a threshold circuit which compares the voltage level of an incoming signal with a reference potential, typically ground. If the incoming signal is above ground, a signal is provided on the output designated with a (+). If the incoming signal is below ground, a signal is provided on the output designated with a (−). The incoming distorted test pulse is also applied to the comparator 40, which compares incoming voltages to a zero reference, through a K bit analog delay circuit 41, where $K=1+P$ and P equals the number of bit intervals preceding the main peak of the incoming pulse. The first portion of the incoming test pulse is applied to the comparator 40 when the counter 34 is stepped to 1; if the incoming pulse differs from zero at the pulse sampling time the comparator 40 applies a voltage via OR circuit 42 and the second flip-flop 29 to close the second gate 36 and to turn off or damp the bit rate generator 26. The comparator 40 also selectively sets a third flip-flop 44 which provides an appropriate sign or polarity indication in output gates 46. The counter 34 applies a voltage from a cell thereof to a corresponding unit in the output gates 46. The first gate 24 is activated via the close side of the flip-flop 29 so as to permit a slow speed data clock to apply pulses through the first gate 24 to a ring 48 to read out serially the position or location, in binary form, of the portion of the incoming pulse in error and the sign of the error. A truncated decoder 51 having its inputs connected to the counter 34 provides a voltage to the comparator 40 which inhibits it at a peak time. The output from the output gates 46 is transmitted at low speed through the modulator 30, transmission medium 28 and demodulator 32 to an address decoder 50 which directs the error position and polarity signals to appropriate cells, which make a one unit correction in a storage register 52 of the waveform generator 54 of the type described and illustrated in a commonly assigned copending application, Serial No. 245,543 filed by H. L. Funk and L. Skarshinski on December 18, 1962 and issued May 18, 1965, as Patent No. 3,184,685, wherein digital to analog converters are controlled by cells of a register. Each cell of storage register 52 is connected to one of the digital to analog converters 62. The value stored in the register cell 52 selected by address decoder 50 is corrected by one unit in a positive or negative direction depending upon the sign of the error detected by comparator 40. The selected register cell 52 causes a correction of one unit in the corresponding digital to analog converter 62. In this manner the group of digital to analog converters 62 provides a series of individual voltage steps, the magnitude of each step depending upon the value set into the converters 62 by the associated register cell 52.

The voltage steps provided by converters 62 are assembled into a waveform by shift register 60. A pulse from data source 56 is placed into the first position of register 60. At this time the first digital to analog converter 62 (*D/A* 1) provides an output to either amplifier 64 or amplifier 66 depending upon the sign of the output to be provided to the low pass filter 68. After the clock pulse is provided by clock 57 the pulse is advanced from the first position ($S_1$) to the second position ($S_2$) of shift register 60. At this time the second digital to analog converter 62 (*D/A* 2) provides another voltage step. In a similar manner the pulse originating from data source 56 is shifted through register 60 sequentially activating each of the digital to analog converters 62 thereby assembling a series of voltage steps which are smoothed into a continuous waveform by the low pass filter 68.

Data source 56 may provide a pulse to the first position of shift register 60 before the previous pulse, or pulses, have reached the end of shift register 60. In this case more than one digital to analog converter 62 provides a voltage step to the amplifiers 64 and 66 which perform the function of summing the various voltage steps simultaneously applied thereto into a single output. Therefore the shape of the waveform provided by filter 68 is not only dependent upon the values set into digital to analog converter 62 by the cells of storage register 52, but also upon the number of pulses and spacing therebetween provided by data source 56.

Returning to the description of the circuit of FIG. 1, during the testing operation, the next peak of the incoming test waveform, as modified by the unit correction, applied to the peak sensor and bit rate generator 26 causes the entire sequence to be repeated. When the counter 34 reaches its $2^R$ position a pulse passes through OR circuit 42 to the second flip-flop 29 which closes the second gate 36 and activates the first gate 24 and an end of test bit is added to the serial output code in the output gates 46 which is detected in the address decoder 50. A pulse from the $2^R$ position of the counter 34 is applied to the first flip-flop 22 to close the first gate 24 after being delayed by delay 45 for a period of time sufficient to permit the ring 48 to read out the contents of the output gates 46.

After the address decoder senses the end of test bit from the output gates 46, data pulses from a data source 56 may be transmitted through the high speed modulator 12, demodulator 16 and the switch 18, appropriately positioned, to a utilization device 58 which will receive pulses each of a single bit duration from the waveform generator 54. The data source 56 is coupled to a shift register 60 which in accordance with the description above connects selected outputs of digital-to-analog converters 62 to a pair of summing amplifiers 64 and 66. Each of the digital-to-analog converters 62 includes a potential source and several attenuating resistors of various values (not shown). The resistors selectively couple the potential sources to the summing amplifiers 64 and 66 to generate a complex waveform of the type to be described below. Additional details of the manner in which the complex waveform is generated may be found in the above application Serial No. 245,543. The data source 56 is synchronized with the shift register 60 by a clock 57.

Figure 2:
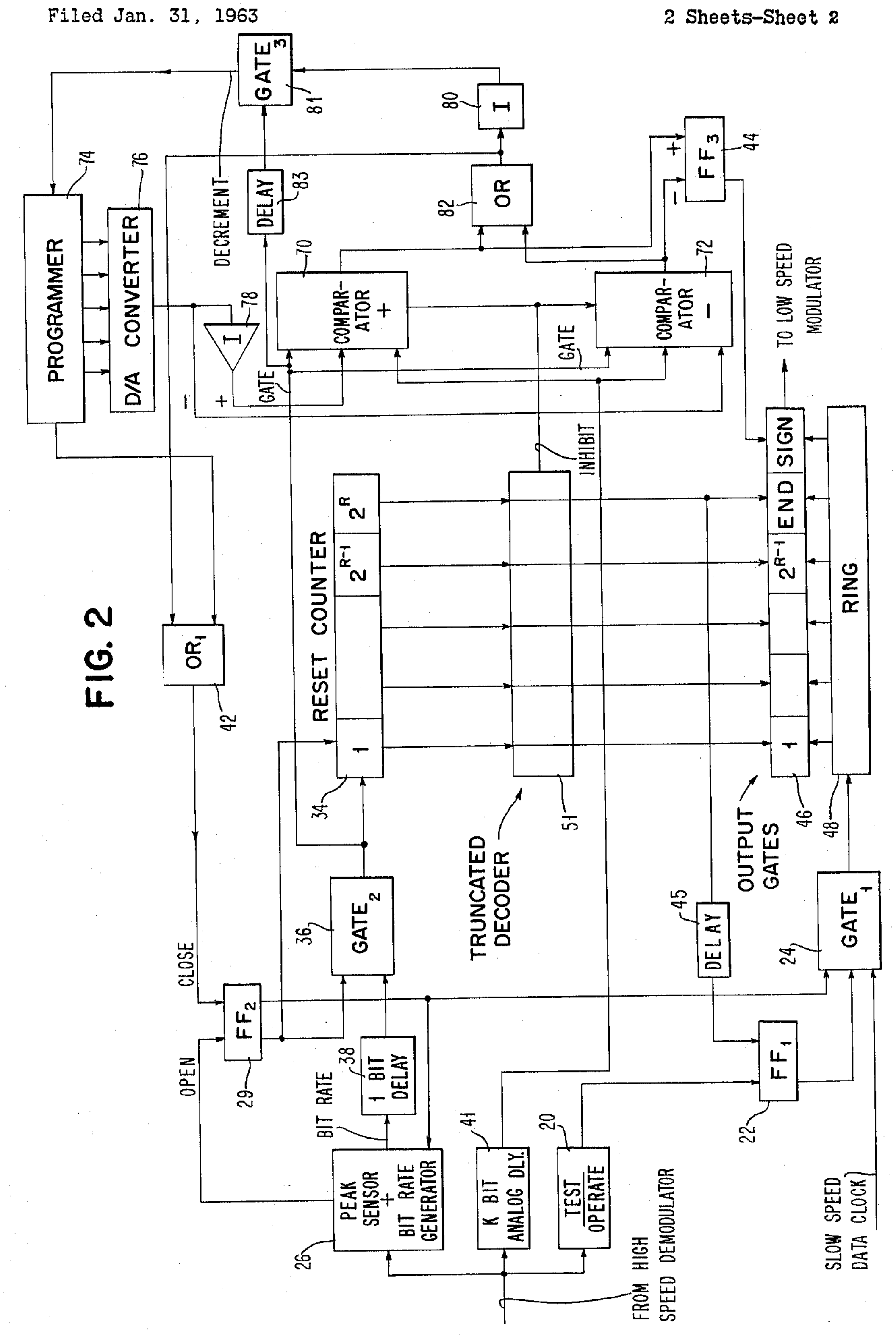
FIG. 2 shows a modification of the embodiment illustrated in FIG. 1 of the drawing.

In FIG. 2 of the drawing there is illustrated a modification of the embodiment of the invention shown in FIG. 1. In FIG. 2 the system includes a positive voltage comparator 70 and a negative voltage comparator 72 which are provided instead of the single zero voltage comparator 40 in the system of FIG. 1. A program unit 74 which may be, for example, a standard counter. The counter in programmer 74 is stepped one unit at a time in response to an input pulse. The output of the counter in programmer 74, controls the output of a digital to analog converter 76 which applies a negative voltage to the negative voltage comparator 72 and a positive voltage through a voltage polarity inverter 78 to the positive voltage comparator 70. Initially, the digital to analog converter 76 is adjusted by the programmer 74 so as to generate a voltage magnitude somewhat greater than the maximum anticipated overshoot of the received distorted test pulse. The magnitude of the output voltage from the digital-to-analog converter 76 is reduced by stepping the counter in programmer 74 one unit at a time until an error signal is generated by the comparator 70 or 72. A steady output voltage is maintained at the output of the digital to analog converter 76 until all errors are cleared at a particular voltage level, after which the converter 76 is decremented in response to a logic inverter 80 coupled to an OR circuit 82 in an attempt to further reduce the error at any of the bit sampling times other than that of the main peak of the received test pulse. A third gate 81 gated by pulses from the second gate 36 delayed for a small portion of a bit interval is connected to the output of the inverter 80 to provide an appropriately timed decrementive pulse to the programmer 74. When the converter output reaches zero the testing operation is completed and the transmission of digital data may commence.

Although the embodiments of the present invention have been described and illustrated as systems wherein the address decoder 50 receives information relating to only the position and polarity of an overshoot in a received test pulse, it should be understood that information relating to the magnitude of the overshoot at bit sampling times may also be transmitted to the waveform generator in a manner somewhat similar to that described in the above-identified copending application by sampling, quantizing, storing and combining amplitude samples in their respective order with the original single test pulse to form a predistorted wave. Furthermore, it should be understood that by providing sufficient storage at the receiver of the system, information relating to the deviation from zero at all of the bit sampling times may be transmitted to the waveform generator at one time.

The system of the present invention has operated successfully at 8000 bits per second using a four-level vestigial-sideband modem transmitting via one loop of an L-carrier channel. A twelve sample predistorted waveform is used.

While the invention has been particularly shown and described with reference to preferred embodiments thereof, it will be understood by those skilled in the art that various changes in form and details may be made therein without departing from the spirit and scope of the invention.

What is claimed is:

In a data transmission system for transmitting pulses at a certain data bit rate, the response of said system distorting each transmitted pulse into a received waveform having the characteristic shape of a main peak and a plurality of smaller additional peaks, the combination comprising:

(a) transmitting means for transmitting a first test pulse through said system, said transmitting means including a generator for adjusting the shape of pulses to be transmitted;

(b) receiver means connected to receive a first waveform having said characteristic shape resulting from transmission of said first pulse for comparing said first waveform with a certain reference potential at sampling times corresponding to said data bit rate and wherein at least one of said sampling times occurs at the location of the main peak of said first waveform; and (c) feed-back means connected between said transmitter and receiver for adjusting said generator in response to the comparisons made by said receiver means to produce a second test pulse resulting in a second waveform after transmission in which the potentials at sampling times other than the time corresponding to the main peak of said second waveform are substantially equal to said reference potential, whereby transmission of closely spaced pulses at said data bit rate having the shape of said second test pulse can be individually detected at said receiver means by comparing the received waveforms of said closely spaced pulses at said sampling times with said reference potential, deviations from said reference potential indicating the reception of a main peak.

References Cited by the Examiner

UNITED STATES PATENTS

| | | | |
|---|---|---|---|
| 2,865,564 | 12/1958 | Kaiser et al. | 340—347 |
| 2,945,220 | 7/1960 | Lesti et al. | 340—347 |
| 2,970,189 | 1/1961 | Van Dalen et al. | 340—146.1 |
| 3,003,031 | 10/1961 | Posthumus | 178—69 |

DARYL W. COOK, *Acting Primary Examiner.*

MALCOLM A. MORRISON, *Examiner.*

D. M. ROSEN, W. J. KOPACZ, *Assistant Examiner.*